(12) United States Patent
Flynn et al.

(10) Patent No.: US 6,701,959 B1
(45) Date of Patent: Mar. 9, 2004

(54) HIGH FLOW RATE BALANCED POPPET VALVE

(75) Inventors: Edward A. Flynn, Pewaukee, WI (US); Curt L. VanWeelden, Sussex, WI (US)

(73) Assignee: Husco International, Inc., Waukesha, WI (US)

( * ) Notice: Subject to any disclaimer, the term of this patent is extended or adjusted under 35 U.S.C. 154(b) by 58 days.

(21) Appl. No.: 10/213,678

(22) Filed: Aug. 6, 2002

(51) Int. Cl.[7] .............................................. F15B 13/044
(52) U.S. Cl. .............................. 137/625.65; 137/625.27
(58) Field of Search ........................ 137/625.27, 625.65

(56) References Cited

U.S. PATENT DOCUMENTS 3,202,182 A * 8/1965 Haviland ............... 137/625.65
5,570,721 A * 11/1996 Funke et al. ........... 137/625.65

* cited by examiner

*Primary Examiner*—Gerald A. Michalsky
(74) *Attorney, Agent, or Firm*—George E. Haas; Quarles & Brady LLP

(57) ABSTRACT

A valve has a body has a bore into which open an inlet, an outlet, and a workport. A first valve seat is between the inlet and the workport, and a second valve seat is between the outlet and work ports. A poppet slides within the bore and a spring biases the poppet toward the first valve seat. Pressure at the inlet acts on surfaces of the poppet producing opposing forces that respectively tend to move the poppet toward the first and second valve seats. Because of differing surface areas, the nominal inlet port pressure exerts a net force on the poppet which substantially counteracts the spring force. Thus a solenoid actuator needs only to produce a relatively small force to move the poppet away from the first valve seat into engagement with the second valve seat.

19 Claims, 1 Drawing Sheet

HIGH FLOW RATE BALANCED POPPET VALVE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to electrohydraulic control valves, and more particularly to such valves which incorporate a balanced poppet.

2. Description of the Related Art

In an effort to improve fuel economy, automobile manufacturers have devised systems that deactivate selected engine cylinders when the full power produced by all the engine cylinders is not required. For example, Cadillac introduced the "V-8-6-4 engine" which switched between 4, 6 and 8 cylinder operation. The selection of which cylinders to deactivate is determined by engine firing order with the desire to keep an even firing order in the deactivated mode. Several modes of cylinder deactivation are possible. In a bank mode, the multiple cylinders in the same bank of a V configuration engine are switched at the same time, whereas each cylinder is switched independently in the cylinder control mode. A given cylinder is activated and deactivated by controlling the operation of the intake valves for that cylinder. By disabling the intake valve or valves for a given cylinder, the air-fuel mixture does not enter that cylinder and thus combustion does not occur Some engine designs employ multiple intake valves through which an air-fuel mixture is supplied to the cylinder. Fuel conservation also can be achieved by selectively switching operation of different numbers of the intake valves for a given cylinder.

The engine intake valve operation is controlled by a solenoid valve which governs the flow of pressurized engine oil to an intake valve actuator. When the solenoid valve energized, pressurized engine oil is applied from a work port to operate a spring biased locking pin inside the intake valve lifter, which effectively decouples the cam shaft from the cylinder intake valve. When the solenoid is de-energized, the valve's work port is connected to the engine oil sump removing the pressure to the intake valve actuator which results in a spring biasing the locking pin to activate the intake valve.

It is desirable to control the switching of the engine intake valves in less than one engine cycle. Therefore, the solenoid valve must respond very quickly in order to ensure timely deactivation and reactivation of the engine cylinder valve. Thus, it is desirable that the solenoid valve is required to generate as little force as possible thereby minimizing operating time.

SUMMARY OF THE INVENTION

An electrohydraulic control valve is provided to control the flow of engine oil which has a nominal pressure. That control valve includes a tubular valve body with a longitudinal bore there through and forming an outlet port at one end of the valve body. An inlet port and a work port extend transversely through the valve body opening into the longitudinal bore. A first valve seat is located in the valve body between the inlet port and work port, and second valve seat is located between the work port and the outlet port.

A poppet is received within the bore of the valve body and is able to move between a first position at which the poppet engages the first valve seat and a second position at which the poppet engages the second valve seat. A notch is formed in a portion of the poppet that is adjacent the inlet port so that the pressure of the oil in the inlet port acts on the notch surfaces. The notch has a first end surface on which pressure in the inlet port exerts a first force that tends to move the poppet into engagement with the first valve seat. The notch having a second end surface on which pressure in the inlet port exerts a second force that tends to move the poppet into engagement with the second valve seat. A spring which provides a spring force that biases the poppet into engagement with the first valve seat.

An actuator of the valve includes a solenoid coil wherein application of electric current to the solenoid coil moves an armature that engages the poppet. That action causes the poppet to move away from engagement with the first valve seat and into engagement with the second valve seat.

The first and second end surfaces of the notch in the poppet are so designed wherein the nominal pressure in the inlet port acting on those surfaces exerts a net force on the poppet which substantially counteracts the spring force. This balancing of forces enables a relatively small actuator to be employed as the actuator need only produce a relatively small force to move the poppet between the first and second valve seats.

Another aspect of the electrohydraulic control valve is a unique design of the valve elements which enable the use of plastic components and ultrasonic welding of those components to facilitate assembly of the valve.

DETAILED DESCRIPTION OF THE INVENTION

Figure 2:
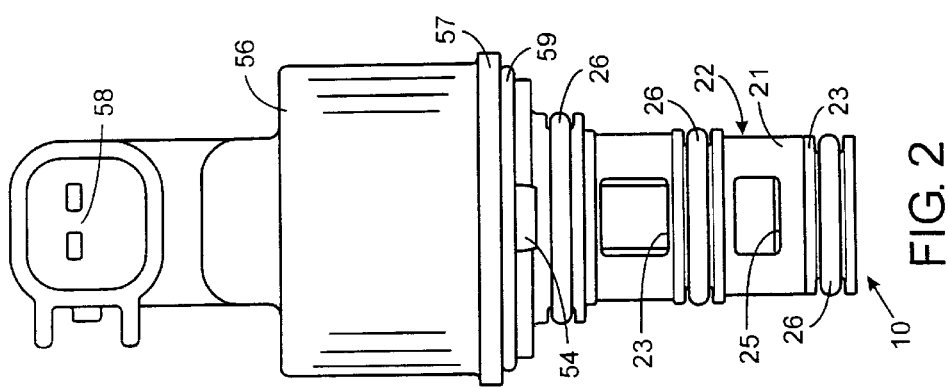
FIG. 2 is a side view of the electrohydraulic valve.
Figure 1:
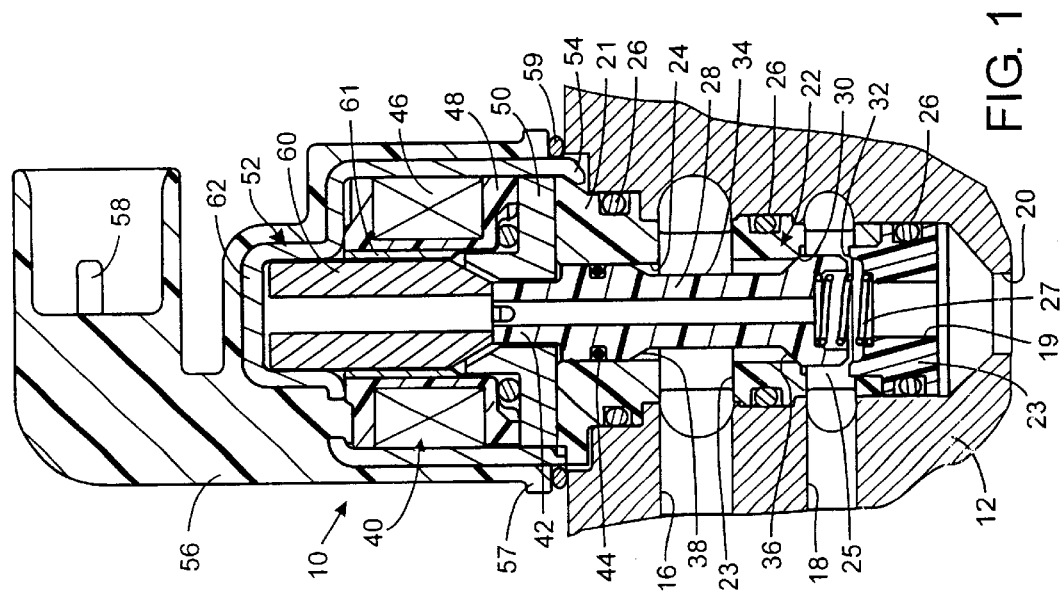
FIG. 1 is a cross sectional view of an electrohydraulic valve according to the present invention.

With reference to FIGS. 1 and 2, an electrohydraulic valve 10 is mounted within an aperture 14 in a manifold 12 to control the flow of pressurized fluid to and from a control passage 18 to which the engine valve actuator (not shown) is connected. The manifold 12 has a supply passage 16 which conveys engine oil at a generally constant nominal pressure from a pump (not shown) to the aperture 14. The control passage 18 also extends through the manifold 12 and opens into a side of the aperture 14. An inner end of the aperture 14 forms an outlet port 19 which communicates with a return passage 20 leading to the tank of the hydraulic system.

The electrohydraulic valve 10 has a valve body 22 which extends into the manifold aperture 14. The valve body 22 comprises an elongated tubular section 21 and an annular end cap 23, both formed of plastic. The end cap is ultrasonically welded to the interior end of the tubular portion 21 after a valve poppet 28 and return spring 27 are inserted into the tubular portion. The ultrasonic weld between the two plastic parts of the valve body 22 provides a strong, fluid-tight bond. The ultrasonic welding technique is relatively easy to accomplish, thereby facilitating high volume production of the valve components.

The tubular valve body 22 has a central bore 24 extending there through with a transverse inlet port 23 and a transverse work port 25 that respectively connect the manifold passages 16 and 18 to the central bore 24. The inlet and work ports 23 and 25 in the valve body 22 have a generally rectangular shape as shown in FIG. 2. The use of rectangular port apertures provides the maximum flow area for a given axial length of the openings and thus optimal flow rate for a valve body of a given size.

A plurality of sealing rings 26 extend around the valve body 22 and engage the wall of the aperture 14 to block any fluid from passing between the valve body and the manifold 12. A plastic valve poppet 28 is slidably received within the central bore 24 of the valve body 22. The poppet 28 has a projection 42 that extends outward from the valve body 22. A low friction sealing ring 44 extends around this portion 42 of the poppet, preventing fluid leakage between those components while eliminating a close clearance fit that can jam with debris in dirty fluid furnished by supply passage 16.

At one extreme end of travel, the poppet 28 engages a first valve seat 30 that is located between the inlet port 23 and the work port 25, and at the opposite end of travel, the poppet 28 abuts a second valve seat 32 located between the work port 25 and the outlet port 19. The return spring 27 biases the poppet 28 with respect to the valve body 22 and away from engagement with the second valve seat 32. The return spring 27 exerts a force on the valve poppet that is less than 150 percent, and preferably approximately 120 percent or less of the force due to the nominal fluid pressure within the supply passage 16 and inlet port 23. In other words, the return spring 27 tends to bias the poppet into engagement with the first valve seat 30

The valve poppet 28 has an exterior annular notch 34, which provides a path for fluid to flow between the inlet and work ports 23 and 25 when the poppet 28 is disengaged from the first valve seat 30, as will be described. A first surface 36 is located at one end of the annular notch 34 which is proximate to the work port 25, and a second surface 38 is located at the opposite end of the poppet notch 34. The pressure in the inlet port 23 acts on both of these surfaces 36 and 38. The first surface 36 has a larger area than that of the-second surface 38, which creates a slight imbalance in the forces of the pressurized fluid 16 acting on the two surfaces 36 and 38. As a consequence, a net force results in a direction which tends to move the valve poppet 28 toward the second seat 32 against the force provided by the return spring 27.

As noted previously, the poppet return spring 27 exerts a force on the valve poppet 28 that is that is less than 150 percent, and preferably approximately 120 percent or less, of the net force that is exerted on the valve poppet 16 by the nominal pressure within the supply passage 16. That relationship between the forces due to the pressurized fluid and that provided by the spring offers three advantages. First, the valve 10 is designed so that the nominal pressure in the supply line 16 nearly balances the force provided by the return spring 27. Thus a solenoid actuator 40 is able to operate the valve with a relatively small force. Secondly, if the pressure in the supply line 16 becomes too great, the valve 10 will crack open automatically and relieve that pressure by providing a path directly between the supply passage 16 and the tank return passage 20, as will be described. However, if the supply pressure becomes too extreme (e.g. greater than two times the nominal supply pressure) the valve poppet 20 is driven against the second valve seat 32 thereby closing that relief path. Thirdly, the diameter of the first and second valve seats 30 and 32 can be sized to provide whatever flow rate is required by the hydraulic system without producing a relatively large pressure force that must be overcome by the return spring 27 and solenoid actuator 40. In the preferred embodiment the contact areas of the first and second valve seats 30 and 32 are equal. This latter feature also enables the electrohydraulic valve 10 to be tested during manufacturing independently of the particular manifold 12 which is used by a customer. Thus, the valves may be fabricated and tested without knowing the particular operating characteristics of the system in which the end customer will use the valve. This also means that there are no critical features that are required in the manifold for the valve to function properly.

Figure 3:
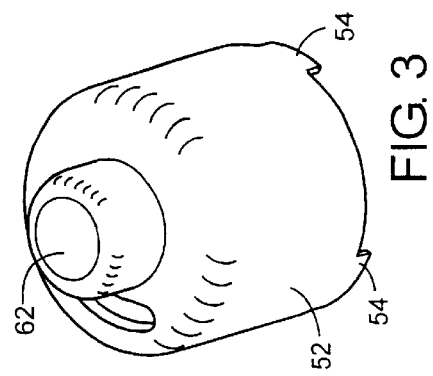
FIG. 3 is an isometric view of a housing in the electrohydraulic valve.

The solenoid actuator 40 is attached to an end of the valve body 22 which projects out of the manifold aperture 14. The solenoid actuator 40 comprises a solenoid coil 46 which is around a bobbin 48. A ferromagnetic pole piece 50 has a cylindrical section which extends into the bobbin 48 and has a flange which is located between the bobbin and the exposed end of the valve body 22. A metal housing 52 encloses the valve bobbin and pole piece 50 and has a plurality of tabs 54 crimped around an exposed edge of the valve body 22 to secure the actuator 40 thereto (see also FIG. 3).

A plastic outer enclosure 56 is molded around the housing 52 and includes an electrical connector 58 for coupling the solenoid coil 46 to the electronic circuitry for activating the electrohydraulic valve 10. The outer enclosure 56 has an end flange 57 that is sealed against the external surface of the manifold 12 with an O-ring 59 there between. Thus, water from the external environment is prevented from seeping between the enclosure 56 and the manifold from where it could reach the electrical components of the valve and produce an electrical short.

Referring still to FIG. 1, an armature 60 of ferromagnetic material is slidably received within the bobbin 48 and a cap portion 62 of the metallic housing 52. The armature 60 slides longitudinally within the bobbin in response to a magnetic field produced by application of electric current to the solenoid coil 46. A thin stainless steel tube 61 within the bobbin 48 guides the movement of the armature. When the solenoid coil 46 is energized with electricity supplied via connector 58, the resultant electromagnetic field forces the armature 60 against the valve poppet 28. The force from the armature 60 overcomes the return spring force, thereby pushing the valve poppet 28 away from the first seat 30 toward the second valve seat 32.

As noted previously, the force of the pressure in the supply passage 16 acting on poppet surfaces 36 and 38 produces a net force which substantially equals the force exerted on the valve poppet 28 by the return spring 27. As a consequence, the solenoid actuator 40 needs to apply a relatively small additional force in order to move the poppet 28 away from the first valve seat 30 and against the second valve seat 32, thereby providing a fluid path between the inlet port 23 and the work port 25 of the valve. This pressure balancing enables a relatively small solenoid coil 46 to be employed, thus reducing the size of the actuator 40.

The unique design of the poppet 28 also enables it to serve a pressure relief function. Should the pressure in the supply passage 16 rise more than a 120 percent of its nominal operating pressure, the resultant force on the poppet overcomes the counterforce provided by the return spring 27. Under this condition, the poppet 28 will move slightly away from the first valve seat 30, but not a sufficient distance to engage the second valve seat 32. In this state, a path is thereby provided from the inlet port 23 through each of the valve seats 30 and 32 to the outlet port 19. This relieves the excessive pressure within the supply passage 16 to the tank return passage 20. Once that excessive pressure has reduced significantly, the force of the return spring 27 again force the valve poppet 28 against the first seat 30 closing that relief path.

What is claimed is:

1. An electrohydraulic control valve for controlling flow of a fluid having a nominal pressure, said electrohydraulic control valve comprising:

a tubular valve body having a longitudinal bore there through forming an outlet port at one end of the valve body, and having with an inlet port and a work port extending transversely through the body in communication with the longitudinal bore, the valve body further including a first valve seat between the inlet port and work port and a second valve seat between the work port and the outlet port;

a poppet received within the bore of the valve body and slidable therein between engagement with the first valve seat and engagement with the second valve seat, the poppet including a notch in communication with the inlet port, the notch having a first end surface on which pressure in the inlet port acts producing a first force that tends to move the poppet into engagement with the first valve seat, and the notch having a second end surface on which pressure in the inlet port acts producing a second force that tends to move the poppet into engagement with the second valve seat;

a spring which exerts a spring force that biases the poppet into engagement with the first valve seat; and an actuator having a solenoid coil within which is received an armature that engages the poppet, wherein application of electric current to the solenoid coil moves the poppet away from engagement with the first valve seat and into engagement with the second valve seat;

wherein the nominal pressure in the inlet port and acting on the first end surface and the second end surface exerts a net force on the poppet which substantially counteracts the spring force.

2. The electrohydraulic control valve as recited in claim 1 wherein the spring force is less than 150 percent of the net force produced by the nominal pressure in the inlet port acting on the first end surface and the second end surface.

3. The electrohydraulic control valve as recited in claim 1 wherein the spring force is less than or equal to 120 percent of the net force produced by the nominal pressure in the inlet port acting on the first end surface and the second end surface.

4. The electrohydraulic control valve as recited in claim 1 wherein the second end surface of the notch has an area that is greater than an area of the second end surface of the notch.

5. The electrohydraulic control valve as recited in claim 1 wherein when pressure in the inlet port produces a net force acting on the poppet, which exceeds the spring force by less than a predefined amount, the poppet opens a fluid path between the inlet port, the work port, and the outlet port.

6. The electrohydraulic control valve as recited in claim 5 wherein when pressure in the inlet port produces a net force acting on the poppet which exceeds the spring force by greater than the predefined amount the poppet engages the second valve seat.

7. The electrohydraulic control valve as recited in claim 1 wherein the inlet port and work port comprise rectangular apertures through the valve body.

8. The electrohydraulic control valve as recited in claim 1 wherein the valve body comprises an tubular section and an end cap having the outlet port therein, the end cap is attached to an end of the tubular section by a fluid tight connection.

9. The electrohydraulic control valve as recited in claim 8 wherein the tubular section and the end cap are formed of plastic and are ultrasonically welded together.

10. The electrohydraulic control valve as recited in claim 1 wherein the poppet is formed of plastic.

11. The electrohydraulic control valve as recited in claim 1 further comprising a housing of magnetically conductive material and having a cup-like shape within which the solenoid coil is received.

12. The electrohydraulic control valve as recited in claim 11 wherein the housing comprises an open end with a plurality of tabs projecting there from and crimped around a portion of the valve body to secure the actuator thereto.

13. The electrohydraulic control valve as recited in claim 11 further comprising a plastic enclosure molded externally around the housing.

14. An electrohydraulic control valve for controlling flow of a fluid having a nominal pressure, said electrohydraulic control valve comprising:

a valve body comprising a plastic tubular section and a plastic end cap sealingly connected to an end of the tubular section, the tubular section having a longitudinal bore and an inlet port and a work port opening into the longitudinal bore, the end cap including an outlet port which communicates with the longitudinal bore, the valve body having a first valve seat between the inlet port and work port and having a second valve seat between the work port and the outlet port;

a poppet received within the longitudinal bore of the valve body and slidable between a first position at which the poppet engages the first valve seat and a second position at which the poppet engages the second valve seat, the poppet including a notch in communication with the inlet port, the notch having a first end surface on which pressure in the inlet port acts producing a first force that tends to move the poppet into engagement with the first valve seat, and the notch having a second end surface on which pressure in the inlet port acts producing a second force that tends to move the poppet into engagement with the second valve seat;

a spring which exerts a spring force that biases the poppet toward the first valve seat; and an actuator having a solenoid coil within which is received an armature that engages the poppet, wherein application of electric current to the solenoid coil moves the poppet away from engagement with the first valve seat and into engagement with the second valve seat;

wherein the nominal pressure in the inlet port and acting on the first end surface and the second end surface exerts a net force on the poppet which substantially counteracts the spring force.

15. The electrohydraulic control valve as recited in claim 14 wherein the spring force is less than 150 percent of the net force produced by the nominal pressure in the inlet port acting on the first end surface and the second end surface.

16. The electrohydraulic control valve as recited in claim 14 wherein the spring force is less than or equal to 120 percent of the net force produced by the nominal pressure in the inlet port acting on the first end surface and the second end surface.

17. The electrohydraulic control valve as recited in claim 14 wherein the second end surface of the notch has an area that is greater than an area of the second end surface of the notch.

18. The electrohydraulic control valve as recited in claim 14 wherein the tubular section and the end cap are ultrasonically welded together.

19. The electrohydraulic control valve as recited in claim 14 wherein the inlet port and work port comprise rectangular apertures.

* * * * *